US006488743B1

(12) United States Patent
Venås et al.

(10) Patent No.: US 6,488,743 B1
(45) Date of Patent: Dec. 3, 2002

(54) METAL MELT TREATMENT EQUIPMENT

(75) Inventors: Karl Venås, Saupstad (NO); Pål Christian Skaret, Trondheim (NO); Per Gunnar Strand, Sunndalsøra (NO); Erling Myrbostad, Kvanne (NO); Idar Steen, Sunndalsøra (NO)

(73) Assignee: Norsk Hydro ASA, Oslo (NO)

( * ) Notice: Subject to any disclaimer, the term of this patent is extended or adjusted under 35 U.S.C. 154(b) by 24 days.

(21) Appl. No.: 09/655,720

(22) Filed: Sep. 5, 2000

(30) Foreign Application Priority Data

Sep. 3, 1999 (NO) .......................................... 19994308

(51) Int. Cl.[7] ................................................ B01D 19/00
(52) U.S. Cl. ............................. 95/246; 95/263; 95/266; 96/193; 96/202; 75/528; 75/556; 75/680
(58) Field of Search .......................... 75/680, 528, 556; 261/83, 87, 85; 210/221.2, 188; 95/245, 263, 265, 246, 266; 96/202, 193

(56) References Cited

U.S. PATENT DOCUMENTS 3,849,119 A * 11/1974 Bruno et al.
3,870,511 A * 3/1975 Szekely
4,191,559 A * 3/1980 Van Linden et al.
4,373,704 A * 2/1983 Pelton
4,401,295 A * 8/1983 Yoshida
4,456,479 A * 6/1984 Harris et al.
4,647,306 A * 3/1987 Abratis et al.
4,772,319 A * 9/1988 Otsuka et al.
4,897,115 A * 1/1990 Van Wijk
5,364,450 A * 11/1994 Eckert
5,397,377 A * 3/1995 Eckert
5,462,581 A * 10/1995 Eckert
5,616,167 A * 4/1997 Eckert
5,630,863 A * 5/1997 Eckert
5,718,742 A * 2/1998 Eckert
5,968,223 A * 10/1999 Eckert
6,162,279 A * 12/2000 Eckert

* cited by examiner

*Primary Examiner*—Duane S. Smith
(74) *Attorney, Agent, or Firm*—Wenderoth, Lind & Ponack, L.L.P.

(57) ABSTRACT

Equipment for the treatment of a liquid such as a metal melt has one or more rotors (5) for the supply of gas and/or particulate material to the liquid in a reaction chamber (1). The reaction chamber (1) is closed and has an inlet (3) and an outlet (13) and is designed to be placed under a vacuum. The outlet (13) communicates with another chamber or outlet passage (2). The equipment may have several reaction chambers (1, 2) arranged in series. The first reaction chamber (1) then communicates with the second reaction chamber (2), the second reaction chamber with a third, etc. via an opening (16).

20 Claims, 4 Drawing Sheets a)

b)

Schematic diagram

Schematic diagram
2-rotor treatment unit

Base-mounted rotor
(schematic)

Side-mounted rotor
(schematic)

METAL MELT TREATMENT EQUIPMENT

BACKGROUND OF THE INVENTION

The present invention concerns equipment for the treatment of a liquid such as a metal melt. The equipment comprises a rotor for the supply of gas and/or particulate material to the liquid in a reaction chamber.

A number of solutions for the treatment of liquid using rotating bodies of different designs and types are known from the market and the literature. For example, the applicant's own European patent no. 0151434 describes a method for treating liquid in which a hollow, cylindrical rotor is used in which particulate material and/or gas are/is designed to be supplied to the rotor's cavity through a drilled hole in the rotor shaft. The rotation of the rotor causes the melt to be drawn in through an opening in the base of the rotor and slung out through openings in the side together with the gas and/or material supplied. Although this solution creates little turbulence and agitation in the liquid, is very effective and results in a high treatment capacity, it is an objective of the present invention to produce equipment for the treatment of a liquid, in particular aluminium melt, which is even more effective and has an even higher treatment capacity. At the same time, it is an objective to avoid the treated liquid coming into contact with the surrounding air, in particular the oxygen in the air, in order to prevent the liquid from being affected by the air.

Moreover, regarding the treatment of aluminium melt, it was an objective to achieve an increased removal of both hydrogen and sodium. Another objective was to be able to return most or all of the residual melt to the casting furnace at the end of casting or possibly feed all melt to the casting machine.

SUMMARY OF THE INVENTION

The present invention achieves the above objectives. The present invention is characterized in that a reaction chamber has an inlet and an outlet and is designed to be placed under a vacuum. The outlet communicates with another chamber or outlet passage.

BRIEF DESCRIPTION OF THE DRAWINGS

The present invention will be described in the following in further detail and with reference to the attached figures, where.

DETAILED DESCRIPTION OF THE PREFERRED EMBODIMENTS

Figure 1:
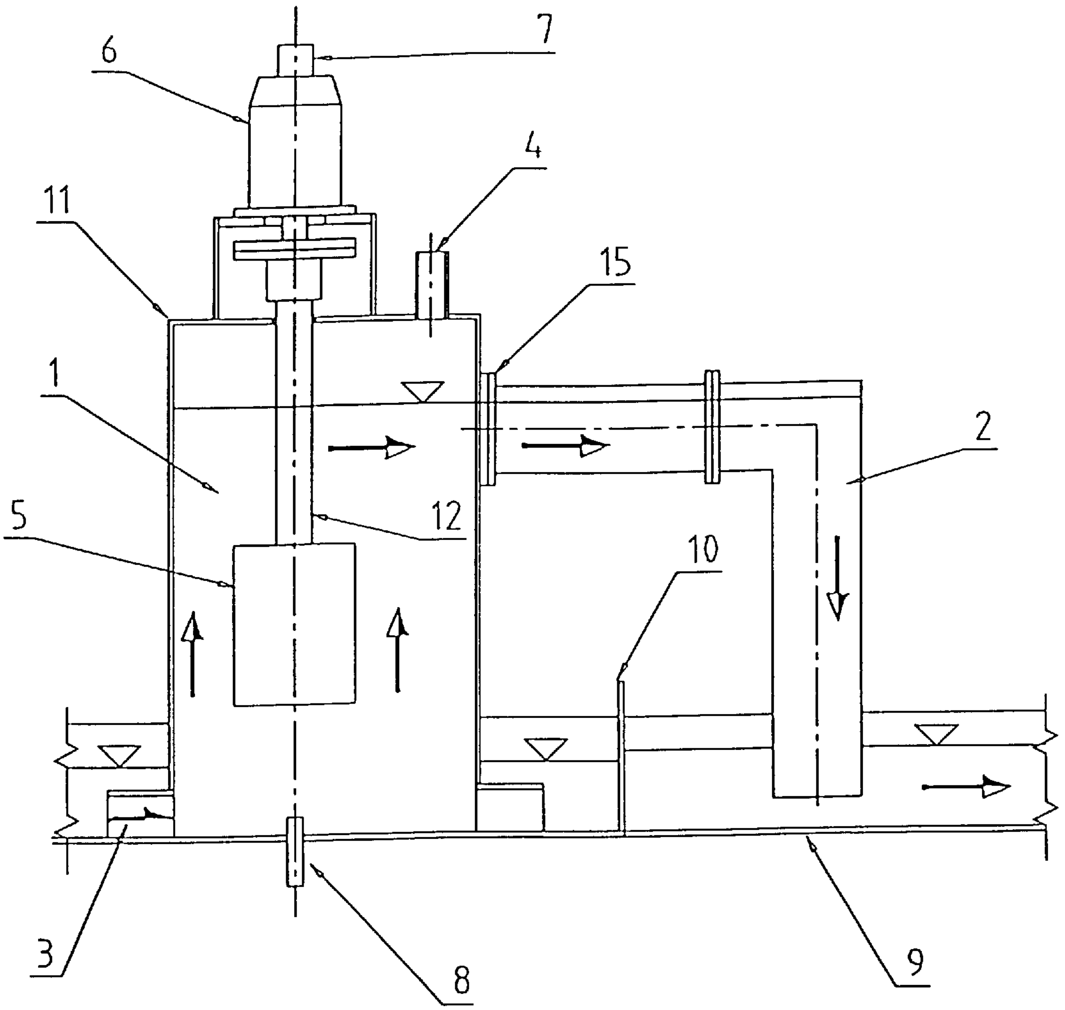
FIGS. 1(*a*) and 1(*b*) are schematic diagrams of the equipment in accordance with the present invention as seen from the side in FIG. 1(*a*) and above in FIG. 1(*b*)
Figure 1:
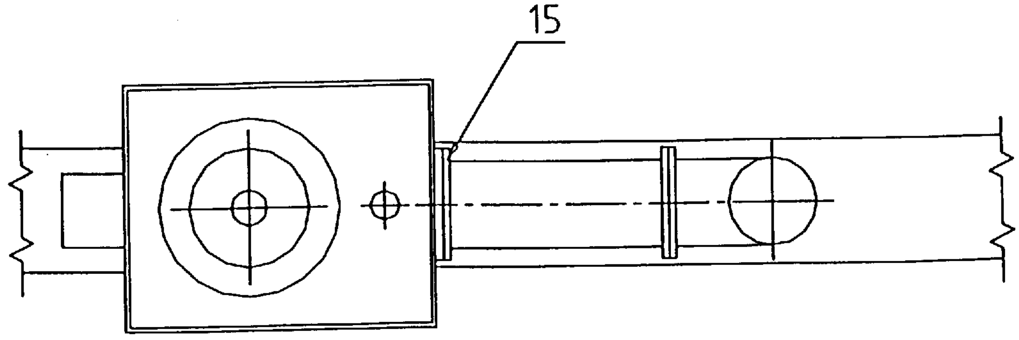

FIG. 1 show, as stated, schematic diagrams of equipment in accordance with the present invention. The equipment was initially developed with a view to treating aluminium melt. However, in reality it may be used to treat any type of liquid, for example for the removal of oxygen from water. The equipment comprises a preferably cylindrical, upright reaction chamber 1 and an outlet passage in the form of an outlet pipe 2. The liquid to be treated flows in through an opening 3 at the lower end of the reaction chamber 1 and is lifted up on account of the vacuum in the chamber produced using a vacuum pump (not shown) connected to a connection socket 4. A rotor 5 is arranged in the chamber 1. The rotor 5 is driven by a motor 6 arranged on the lid 11. The rotor 5 may, for example, expediently be of the type described in applicant's European patent no. 0151434, which is designed to be supplied gas through a rotor shaft 12 via a swivel coupling 7. Instead of being supplied through the rotor 5, the gas may be supplied through a nozzle 8 made of a porous plugstone or the like arranged in the base of the container.

Because of the change in its own weight, the rising gas bubbles cause the liquid to flow from the inlet 3 into the reactor 1 and from there out though the outlet pipe 2, which is connected to the reaction chamber via a flange connection 15. The equipment may expediently be arranged in a channel, preferably closed, or long container 9 for continuous treatment of a liquid, for example, as stated above, aluminium melt. In such case, the inlet 3 may be located at one end and the outlet of the pipe 2 at the other end of the channel 9.

In connection with the equipment, a sluice valve 10 is also arranged in the channel (operation of this is not shown).

When the liquid treatment process begins, the sluice valve 10 is opened so that the liquid runs past the chamber 1 and fills the channel up to a certain level. The sluice valve can now be closed. When a vacuum is applied from a vacuum pump or the like (not shown) via the socket 4 and, at the same time, gas is supplied to the rotor 5 or through the nozzle 8, the circulation of the liquid through the equipment starts as stated above. Moreover, the sluice valve 10 is designed to be opened in connection with gas supply or lack of vacuum or when the treatment process ends so that the melt can run back to the liquid reservoir, a holding furnace, a casting furnace or the like.

As an alternative, it is also possible to supply gas in a counterflow in the outlet pipe 2 (not shown) through a gas nozzle or the like. This allows the effectiveness of the treatment, for example in connection with removal of hydrogen from an aluminium melt, to be increased further due to increased reaction time. I.e. the treatment gas supplied will "meet" the melt which has the lowest hydrogen concentration at the outlet end of the pipe 2 and the gas will come into contact with the melt which has a higher concentration up in the pipe. A combination of a rotor in the reaction chamber 1 and the supply of gas in a counterflow in the outlet pipe 2 will increase the effectiveness. However, the level difference between the liquid in the reaction chamber 1 and the liquid in the outlet pipe will decrease.

Figure 2:
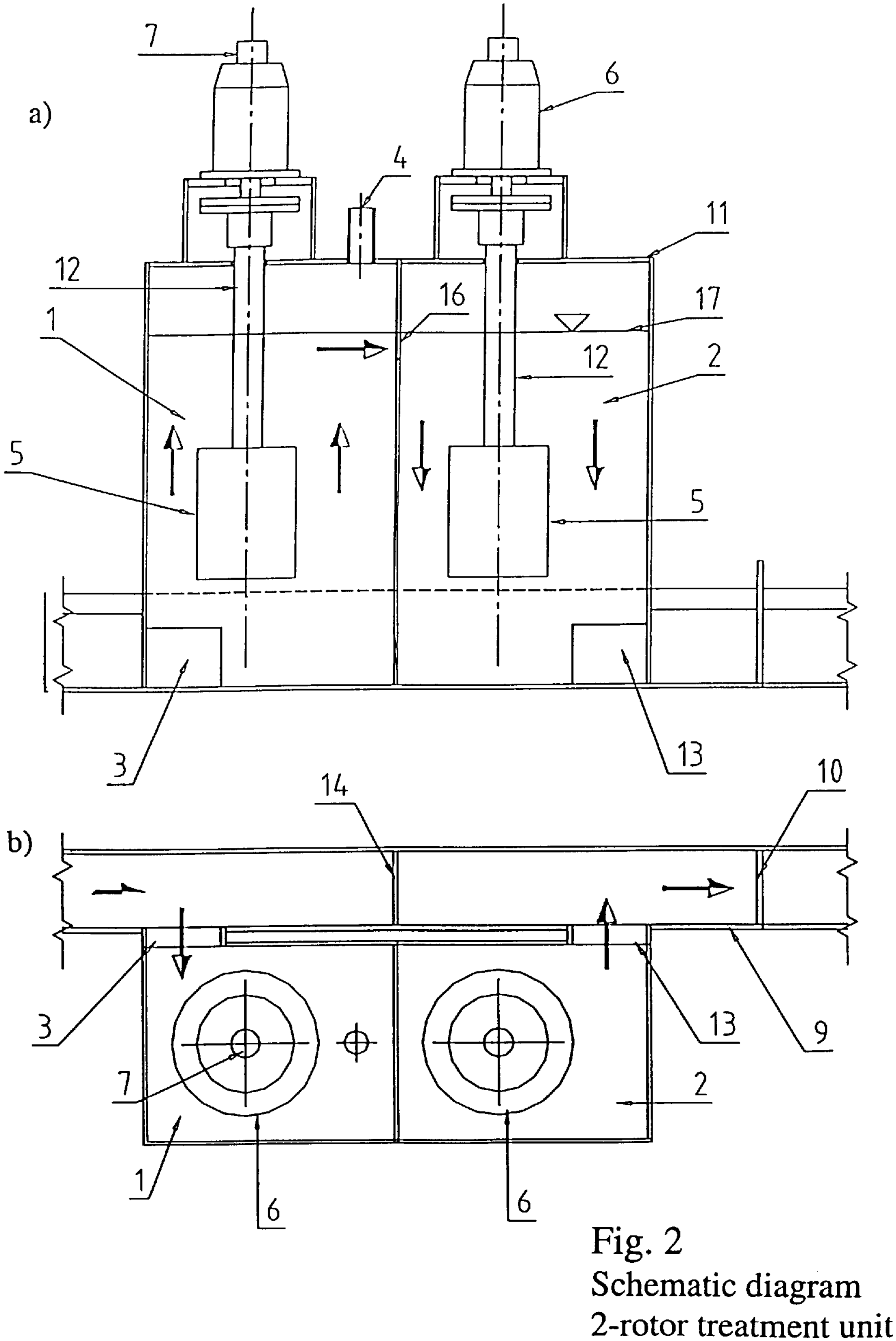
FIGS. 2(*a*) and 2(*b*) are schematic diagrams of an alternative embodiment, with two reaction chambers, of equipment in accordance with the present invention seen in FIG. 2(*a*) in elevation and in FIG. 2(*b*) from above.

FIG. 2 show an alternative embodiment in which two rotors 5 are used and consequently two reaction chambers. The two chambers 1 and 2 are connected in series. Chamber 2 corresponds to the outlet pipe 2 in the previous example shown in FIG. 1.

As in the previous example, the two chambers are arranged in connection with a channel 9 and are designed in such a way that the liquid to be treated flows in through a lateral opening 3, up through the chamber 1, via an opening 16 into the chamber 2 and from there back to the channel 9 via an opening 13. In the chamber 1, the liquid flows in the same direction as the gas supplied through the rotor 5, while in chamber 2, the liquid will flow against the flow of the gas supplied to an equivalent rotor 5.

Another sluice 14 is arranged in the channel 9. When the process begins, the sluice 14 is held open so that the liquid to be treated can flow into the chambers 1 and 2. When the liquid level in the chambers has reached the liquid level in the channel, a vacuum is applied via the socket 4 so that the metal level in the chambers increases (to 17). Circulation through the chambers can now begin by closing the sluice 14, opening the sluice 10 and simultaneously supplying treatment gas to the two respective rotors 5. With this solution, further improved effectiveness is achieved because the reaction time is increased and the liquid flows against the flow of the gas in the reaction chamber 2, as stated in the previous example.

Figure 3:
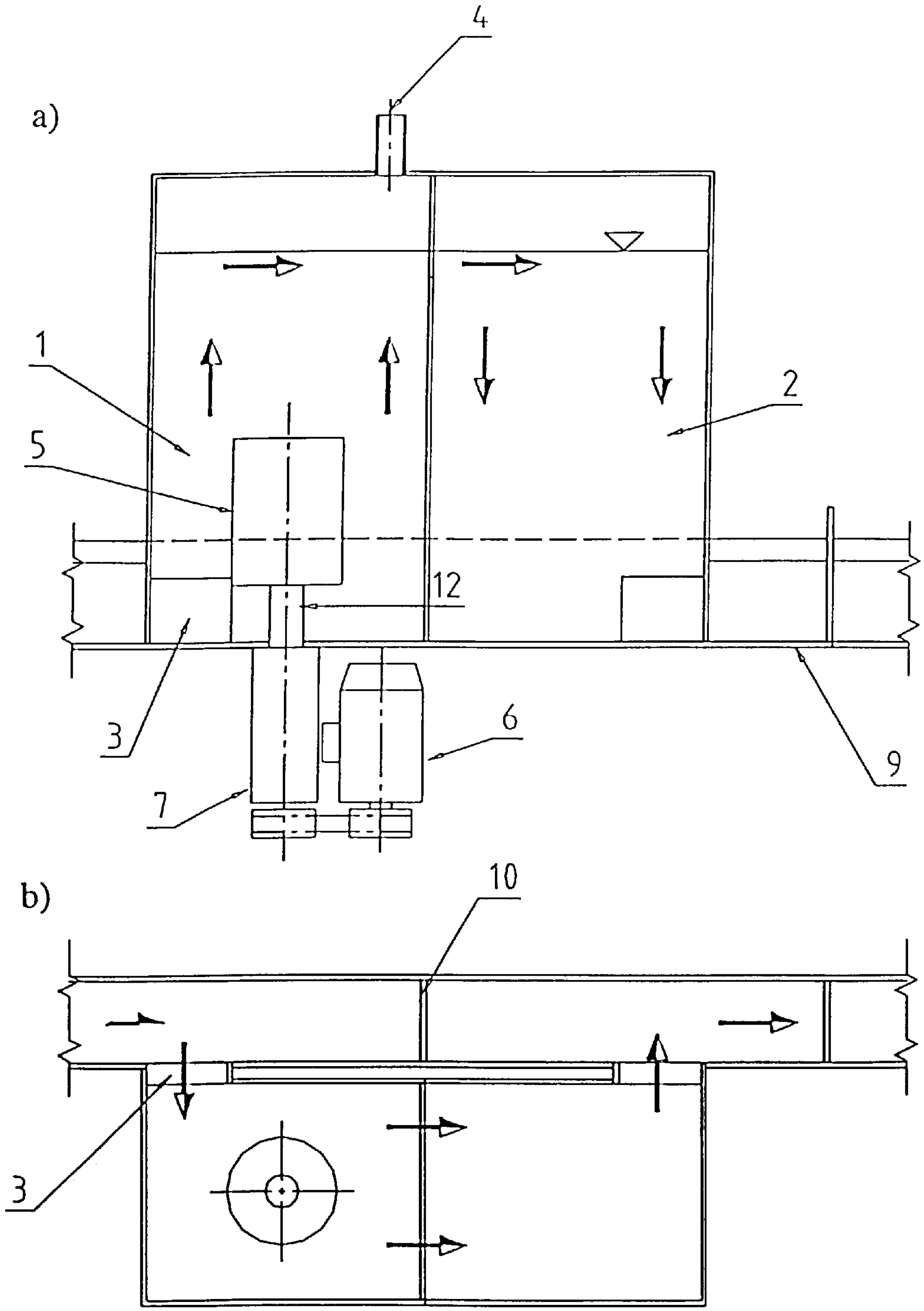
FIGS. 3(*a*) and 3(*b*) show an alternative embodiment with a motor drive arranged on the underside, and are seen in FIG. 3(*a*) in elevation and in FIG. 3(*b*) from above.
Figure 4:
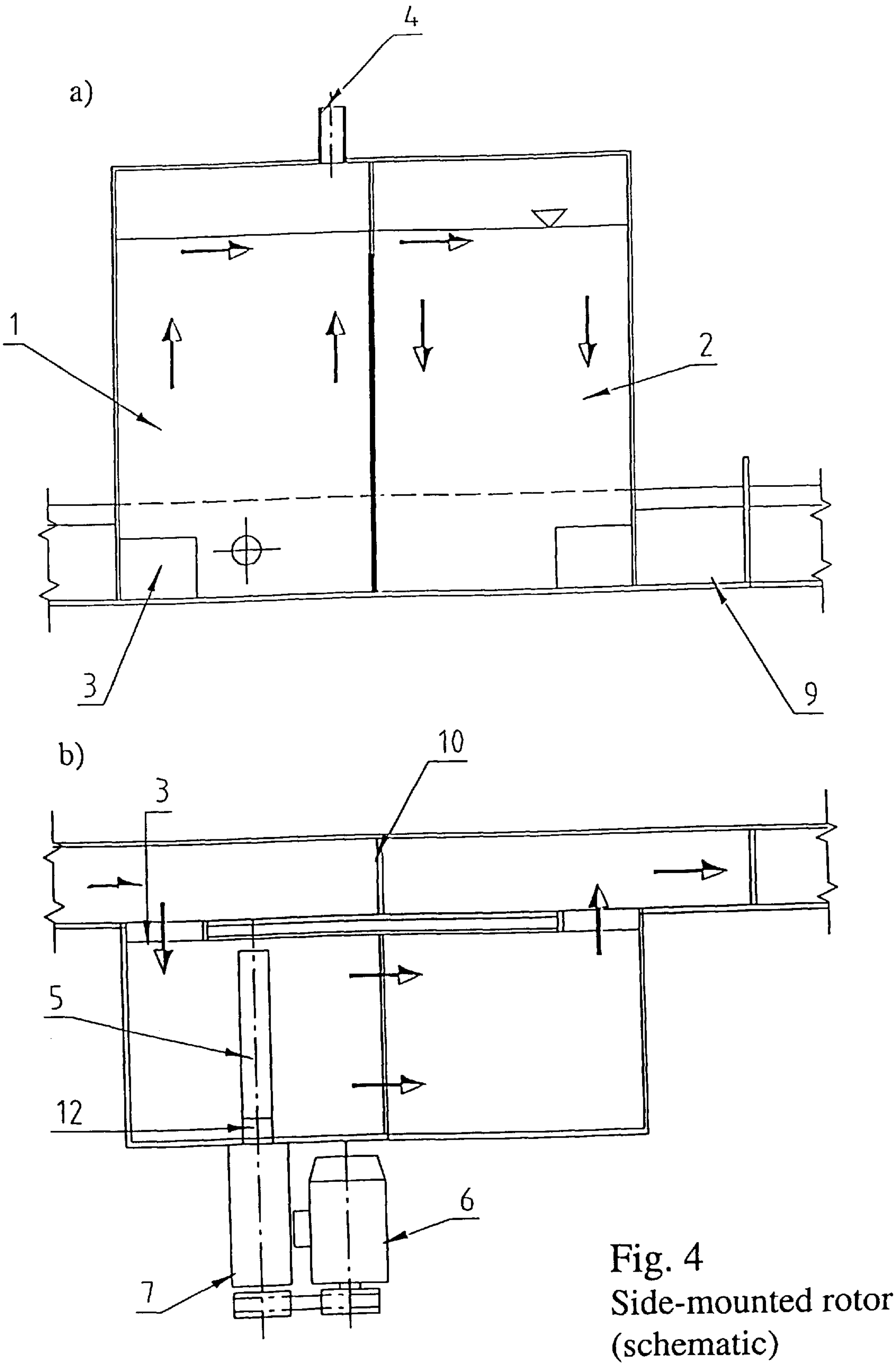
FIGS. 4(*a*) and 4(*b*) show a further embodiment with a motor drive arranged on the side, and are seen in FIG. 4(*a*) in elevation and in FIG. 4(*b*) from above.

In this connection, it should, moreover, be noted that the present invention is not restricted to the solutions described above and shown in the figures. The equipment for treating liquid may, therefore, consist of three, four or more than four reaction chambers connected in series. Moreover, instead of rotors driven from above, rotors may be used which are driven by motors arranged on the underside, as shown in FIG. 3, or on the side of the reaction chamber(s), as shown in FIG. 4, where the rotor shaft(s) extend(s) through the base or side of the chamber(s), respectively.

EXAMPLE

Comparative tests were carried out for the removal of oxygen from water using a rotor arranged in an open vessel (standard solution) and a rotor arranged in an equipment solution as shown in FIG. 1 (the present invention).

The diameter of the vessel in the standard solution was the same as for the reaction chamber (equivalent to 1 in FIG. 1) in accordance with the present invention. The diameter of the rotor was also the same. Nitrogen gas was supplied through the rotor in both cases.

Moreover, the following test apparatuses and components were used.

Power unit 1.5 kW motor with 1400 RPM at 50 Hz.

Frequency converter

Siemens Micro Master, 3 kW

Variation range: 0–650 Hz

Nitrogen

The gas is supplied from 200-bar 50-liter bottles via reduction valves at 99.7% purity.

Rotometer

The gas speed was measured by a rotometer of the type Fischer & Porter—pipe FP-1/2-27-G-10/80.

Float: 1/2 GNSVT—48

Water flowmeter

SPX (Spanner-Pollux GMBH) with Q, 2.5 $M^3$/h.

Cross-sectional opening approx. 25 mm.

Vacuum

In order to produce a vacuum in the reaction chamber, an industrial vacuum cleaner of type KEW WD 40-11 was used. Power 1400 W.

Air flow rate: max. 60 l/sec.

Oxygen meter:

The quantity of oxygen in the water was measured with two oxygen meters of type Oxi 340.

Tachometer:

The RPM were measured with a tachometer of type SHIMPO DT-205.

Rotor:

Standard Hycast TMrotor with holes in the side and base as shown in EP 0151434.

The results of the tests are shown in the table below.

| Reactor type | Rotor type | Gas flow rate Nl/min | RPM | $C_{in}$ ppm | $C_{out}$ ppm | $C_{in-Cout}$ ppm | % $O_2$ removed |
|---|---|---|---|---|---|---|---|
| Invention | Hycast | 30 | 750 | 11.9 | 4.54 | 7.36 | 61.8 |
| Invention | Hycast | 60 | 750 | 11.9 | 3.18 | 8.72 | 73.3 |
| Invention | Hycast | 90 | 750 | 11.9 | 2.6 | 9.3 | 78.2 |
| Standard | Hycast | 30 | 750 | 11.83 | 5.9 | 5.93 | 50.1 |
| Standard | Hycast | 60 | 750 | 11.78 | 4.57 | 7.21 | 61.2 |
| Standard | Hycast | 90 | 750 | 11.76 | 3.84 | 7.92 | 67.3 |

As the table shows, an improvement in oxygen removal effect, depending on RPM, of on the order of 11–15% was achieved with the present invention compared with the standard type of reactor. This represents a considerable improvement regarding the liquid treatment effectiveness.

Compared with traditional melt treatment solutions, the present invention offers several advantages:

1. The vacuum in the reaction chamber(s) results in a lower partial pressure over the melt of the contaminants which are dissolved in the liquid. In an aluminium melt, this will apply in particular to sodium and hydrogen. The low vapor pressure over the melt will affect the equilibrium between the atmosphere and the liquid and thus produce an increased removal effect of the dissolved elements in the reactor/treatment unit.

2. By lifting the liquid level in the reaction chamber(s) to a level which is higher than the level in the channel system, the contact time between the process gas and the liquid will be increased considerably. This results in the process gas being utilized optimally and an improved treatment effect of a given quantity of gas will be achieved.

3. The atmosphere in the reaction chamber(s) will be virtually unaffected by the atmosphere in the room in which the reactor is placed. A low content of hydrogen and water vapor in the reaction chamber(s) reduces the potential for absorption of hydrogen in the reactor. A low content of oxygen and water vapor will reduce the formation of slag in a reactor for treatment of aluminium.

4. Dust and gases which are generated in the reaction chamber(s) during operation are effectively removed by the exhaust system, thus avoiding such gases being emitted into the room in which the reactor is placed.

5. When the treatment has been completed (for example, when the casting of aluminum has been completed), the liquid is automatically drained out of the reactor and out to, for example, a casting machine and/or furnace. Consequently, unwanted drainage of liquid/metal in connection with changing the liquid composition (for example, a new alloy) is avoided and the furnace capacity in the production line can be utilized optimally for production of marketable products.

What is claimed is:

1. Equipment for the continuous treatment of a liquid, said equipment comprising:

a closed reaction chamber having a liquid inlet and a liquid outlet for continuously letting liquid to be treated into said reaction chamber and out from said reaction chamber;

at least one rotor adapted to supply at least one of gas and a particulate material to the liquid in said reaction chamber; and said liquid outlet being connected with another chamber or an outlet passage;

wherein said closed reaction chamber is adapted and operable to be placed under a vacuum; and wherein said closed reaction chamber has said liquid inlet disposed at a lower portion of said reaction chamber and has said liquid outlet positioned above said liquid inlet.

2. The equipment of claim 1, wherein said closed reaction chamber comprises a vacuum pump connection.

3. The equipment of claim 1, wherein said liquid outlet is connected with another chamber so that said reaction chamber is connected in series with said another chamber.

4. The equipment of claim 1, wherein said reaction chamber comprises a device arranged in a base of said reaction chamber for suppying at least one of gas and particulate material to the liquid in said reaction chamber.

5. The equipment of claim 4, wherein said device comprises a nozzle.

6. The equipment of claim 1, wherein said at least one rotor each comprises a respective shaft and motor for driving said shaft, said motor being positioned on top of, the underside of, or on the side of said reaction chamber.

7. Equipment for the continuous treatment of a liquid, said equipment comprising:

a closed reaction chamber having a liquid inlet and a liquid outlet for continuously letting liquid to be treated into said reaction chamber an d out from said reaction chamber;

a rotor adapted to supply at least one of gas and a particulate material to the liquid in said reaction chamber; and said liquid outlet being connected with another chamber or an outlet passage;

wherein said closed reaction chamber is adapted and operable to be placed under a vacuum and comprises a vacuum source connection; and wherein said closed reaction chamber has said liquid inlet disposed at a lower portion of said reaction chamber and has said liquid outlet positioned above said liquid inlet.

8. The equipment of claim 7, wherein said closed reaction chamber has said inlet disposed in a liquid channel.

9. The equipment of claim 8, wherein said outlet comprises an outlet pipe that communicates with said liquid channel.

10. The equipment of claim 8, wherein said outlet is positioned above said inlet of said reaction chamber, and communicates with a second closed reaction chamber that is adapted and operable to be placed under a vacuum, said second reaction chamber having an outlet positioned at a lower portion thereof that communicates with said liquid channel.

11. A method of continuous treatment of a liquid, said method comprising:

continuously letting liquid to be treated into a closed reaction chamber through a liquid inlet and out from the reaction chamber through a liquid outlet for the reaction chamber;

supplying at least one of gas and a particulate material to the liquid in the reaction chamber with at least one rotor;

the liquid outlet being connected with another chamber or an outlet passage;

wherein the closed reaction chamber is placed under a vacuum; and wherein the liquid inlet is disposed at a lower portion of the reaction chamber and the liquid outlet is positioned above the liquid inlet.

12. The method of claim 11, wherein the closed reaction chamber comprises a vacuum pump connection.

13. The method of claim 11, wherein the liquid outlet is connected with another chamber so that the reaction chamber is connected in series with the another chamber.

14. The method of claim 11, wherein a device arranged in a base of the reaction chamber supplies at least one of gas and particulate material to the liquid in the reaction chamber.

15. The method of claim 14, wherein the device comprises a nozzle.

16. The method of claim 11, wherein the at least one rotor each comprises a respective shaft and motor driving the shaft, the motor being positioned on top of, the underside of, or on the side of the reaction chamber.

17. A method of continuous treatment of a liquid, said method comprising:

continuously letting liquid to be treated into a closed reaction chamber through a liquid inlet and out from the reaction chamber through a liquid outlet; and supplying at least one of gas and a particulate material to the liquid in the reaction chamber with a rotor;

wherein the liquid outlet is connected with another chamber or an outlet passage; and wherein the closed reaction chamber is operated under a vacuum provided through a vacuum source connection; and wherein the liquid inlet is disposed at a lower portion of the reaction chamber and the liquid outlet is positioned above the liquid inlet.

18. The method of claim 17, wherein the closed reaction chamber has the inlet disposed in a liquid channel.

19. The method of claim 18, wherein the outlet comprises an outlet pipe that communicates with the liquid channel.

20. The equipment of claim 18, wherein the outlet communicates with a second closed reaction chamber that is operated under a vacuum, the second reaction chamber having an outlet positioned at a lower portion thereof that communicates with the liquid channel.

* * * * *